United States Patent [19]
Plunguian et al.

[11] 3,989,534
[45] Nov. 2, 1976

[54] FOAMED CEMENTITIOUS COMPOSITIONS AND METHOD OF PRODUCING SAME

[76] Inventors: Mark Plunguian, 6912 Columbia Drive; Charles E. Cornwell, 7104 Marlan Drive, both of, Alexandria, Va. 22307

[22] Filed: Aug. 29, 1974

[21] Appl. No.: 501,673

Related U.S. Application Data

[63] Continuation-in-part of Ser. No. 342,859, March 19, 1973, abandoned.

[52] U.S. Cl. .................................. 106/86; 106/87; 106/88
[51] Int. Cl.² ........................................ C04B 21/00
[58] Field of Search ........................... 106/88, 86, 87

[56] References Cited
UNITED STATES PATENTS

| | | | |
|---|---|---|---|
| 2,921,862 | 1/1960 | Sucetti | 106/88 |
| 2,979,415 | 4/1961 | Taylor | 106/88 |
| 2,993,016 | 7/1961 | Sucetti | 106/88 |
| 3,062,669 | 11/1962 | Dilnot | 106/88 |
| 3,522,069 | 7/1970 | Checko et al. | 106/88 |
| 3,615,578 | 10/1971 | Cattanach | 106/88 |
| 3,679,445 | 7/1972 | Howe | 106/88 |

*Primary Examiner*—J. Poer

[57] ABSTRACT

A cellular product useful for such purposes as fire resistance, thermal insulation, and acoustical sound proofing may be produced from a mineral cement, such as gypsum cement, portland cement, calcium aluminate cement, or magneisa cement, an organic film former such as guar gun, or an inorganic film former such as bentonite, a mixture of nonionic and anionic surfactants, a lightweight aggregate, such as perlite, vermiculite, or hollow silicate spheres, and air in amount substantially in excess of that used in air entrainment of cement, whereby the product has a density which is only a small fraction of the density of the mineral cement and aggregate composition per se.

7 Claims, No Drawings

FOAMED CEMENTITIOUS COMPOSITIONS AND METHOD OF PRODUCING SAME

CROSS REFERENCE TO RELATED APPLICATION

This application is a continuation-in-part of our copending application Ser. No. 342,859, filed Mar. 19, 1973, now abandoned.

BACKGROUND OF THE INVENTION

The present invention relates to foamed cementitious compositions and, more particularly, to such compositions containing a large amount of air which appreciably reduces the density of the resulting cellular product.

The addition of relatively small amounts of air to portland cement compositions is known in the art. The term "air entrained" is used to refer to concrete having about 6% of occluded air by volume of the finished product. Such products are made with the aid of an air entrainment additive introduced during grinding of the cement clinkers or by addition to the processing water. The purpose of air entrainment is to improve the freeze-thaw stability of the product. There would be no need to practice such air entrainment if the portland cement had been formulated with air-containing lightweight aggregate as in the present invention.

SUMMARY OF THE INVENTION

A primary object of the present invention is to provide a stable, lightweight cementitious foam composition useful for a wide variety of purposes including fire resistance, thermal insulation, acoustical sound proofing of structural parts such as the inner core in cement sandwich panels, roof decking, gypsum wallboard and the like.

Another object of the present invention is to provide a novel method for the production of stable, lightweight cementitious foams which contain large amounts of air.

Briefly, the lightweight foamed compositions of the invention are produced from (a) a mineral cement such as gypsum cement, portland cement, calcium aluminate cement, or magnesia cement; (b) a lightweight mineral aggregate, such as perlite, vermiculite, or hollow silicate spheres, in an amount of 10-50 parts to 100 parts of the cement; (c) a film former and viscosifier foam stabilizer which may be either an organic film former such as guar gum and/or a collagen protein colloid, or an inorganic film former such as bentonite or montmorillonite, in an amount of about 1-20 parts per 100 parts cement; (d) a synthetic surfactant which is preferably a combination of anionic and nonionic surfactants in an amount of about 0.1-3.0 parts to 100 parts cement; (e) water which is used in processing in an amount of 30-150 parts per 100 parts cement; and (f) air incorporated into the cementitious composition by aeration (i.e., exclusive of the amount of air contained in the lightweight aggregate) in an amount to increase the volume of the cement 5-400%, and preferably 20-200% for most applications.

The foam compositions of the invention may be formed into final products by known techniques such as pumping, spraying, casting, or trowelling to provide settable lightweight foamed compositions whose densities are appreciably less than the density of the employed mineral cement and aggregate composition per se.

The stability of the foams can be improved by the in situ production of a colloidal or structural precipitate from salts in the cementitious compositions, particularly the calcium salts, which will cause the precipitation or salting out by reaction with such organic compounds as sodium abietate, sodium alginate, or sodium carboxymethyl cellulose.

The above and other objects, features, and advantages of the invention will become more apparent as this description proceeds.

DETAILED DESCRIPTION OF THE INVENTION

The stable, lightweight cellular compositions of the invention are produced from a mineral cement, such as gypsum cement, portland cement, calcium aluminate cement, or magnesia cement. An initial reduction in the density of the cement may be achieved by adding a lightweight aggregate such as perlite, vermiculite or hollow silicate spheres. A further appreciable reduction in density may be achieved by incorporating air by aeration of the slurry compositions, usually in amounts substantially in excess of the amounts of air introduced in air-entrained cement.

In order to incorporate such substantial amounts of air into the cementitious composition, use is made of film formers and viscosifiers to increase the stability of the foam, for example, a water soluble natural gum is used.

In accordance with one aspect of the invention, the film former is a cold water soluble organic compound such as pregelatinized starch, guar gum, or xanthan gum, a biopalysoccharide produced by microorganisms. Alternatively, the film former may be an inorganic compound such as bentonite or montmorillonite. The presently preferred film former is guar gum.

The surfactant component, which may be one or more surfactants used in combination, is a bubble forming or foaming agent and is preferably a combination of anionic and nonionic surfactants. Suitable surfactants having these properties are well known in the art. Exemplary nonionic surfactants which may be employed comprise Tergitol NPX (nonyl phenol poly(ethylene oxy) ethanol);
Tergitol TMN (trimethyl nonyl poly(ethylene oxy) ethanol);
Tergitol 15S7 (poly(ethylene glycol) 7 (ethylene oxy) ethanol);
Tergitol 15S9 (poly(ethylene glycol) 9 (ethylene oxy) ethanol);
Tergitol 15S12 (poly(ethylene glycol) 12 (ethylene oxy) ethanol);
Igepal CO630 (nonyl phenol poly(ethylene oxy) ethanol); and
Triton X-165 (octyl phenoxy polyethoxy ethanol).

Suitable anionic surfactants which may be employed include

Alipal CO433 (sodium sulfate alkyl phenoxy poly(ethylene oxy) ethanol;
Neodol 25-3A (Shell Chem. Co.). $C_{12}$–$C_{15}$ linear primary alcohol ethoxy sulfate ammonium salt;
Duponol XL (du Pont). Alkyl alcohol sulfate;
Triton X-200 (Rohm and Haas). Sodium salt of alkyl aryl polyether sulfonate;
Avirol 115 Special (Henkel, Inc.). Sodium alkyl sulfate;
Aerosol MA-80 (American Cyanamid). Dihexyl ester of sodium sulfosuccinic acid;

Stepanol RS (Stepan Chem. Co.). Modified alkyl sulfate;

Ninate 411 (Stepan Chem. Co.). Calcium alkyl aryl sulfonate; and

Ultrawet DS (Arco Chem. Co.). Sodium decyl benzene sulfonate.

Both organic and inorganic film formers have been found useful in the present invention. By the term film former we define a compound which can be dissolved or dispersed in water to form a system of increased viscosity and which upon evaporation of the water in the aqueous system will leave a coherent film. Suitable organic film formers include corn starch, pregelatinized starch, xanthan gum, guar gum and other natural gums such as locust bean gum and carrageenan, casein, collagen protein colloids, sodium alginate, sodium carboxymethyl cellulose, sodium polyacrylate, polyvinyl alcohol, polyacrylamide, polyvinyl pyrrolidone, hydroxyethyl cellulose, methyl cellulose, hydroxypropyl cellulose, sulfoethyl cellulose, and cellulose sulfate. For inorganic film formers one may use bentonite, montmorillonite, magnesium montmorillonite, sodium silicate, magnesium silicate, and magnesium alumino silicate.

The lightweight aggregate may be one of the heat expanded or exfoliated minerals, such as perlite or vermiculite, or hollow silicate spheres.

Presently preferred compositions of the invention contain the following components, exclusive of air; in the following ratios, expressed in parts by weight:

| Component | Parts by Weight |
| --- | --- |
| mineral cement | 100 |
| water (used in processing) | 30 – 150 |
| lightweight mineral aggregate | 10 – 50 |
| organic or inorganic film former | 1 – 20 |
| synthetic surfactant | 0.1 – 3.0 |

The above solid or liquid components may be mixed and the cementitious foam produced by several methods with the addition of air. According to one method, the cement is dispersed with agitation into an aqueous gel containing a foam-producing compatible synthetic surfactant, a foam stabilizer, and a lightweight mineral aggregate. The mixture is stirred to produce a lightweight cellular structure upon setting. A particularly preferred stirring and aerating device for producing the foam is disclosed in our co-pending application Ser. No. 392,643 filed Apr. 27, 1973.

According to another aspect of the foam forming process the dry components of the composition may be initially blended with the liquid surfactants. For this purpose it is necessary to use one of the cold water soluble film formers, such as pregelatinized starch, or guar gum. The surfactant is dispersed uniformly into the dry film former and a mineral carrier, and the aggregate and mineral cement are then blended in. Such a blend is stable during storage. In use, the dry blend is dispersed in a measured amount of water just prior to application, stirred and aerated for 2 – 3 minutes, and the foamed dispersion is further processed by pumping, spraying, casting, or trowelling.

According to a further aspect of the invention, stability of the foam may be achieved by precipitating or salting out various organic acid salts resulting in the in situ production of a colloidal or structural precipitate. Examples of such organic compounds are dry rosin size, sodium abietate, sodium carboxymethyl cellulose or sodium alginate.

The dry blending method is preferably carried out by initially forming a concentrate of the foaming and foam stabilizing components with part of the aggregate or a separate mineral carrier.

This concentrate may then be blended into the cementitious powders in various proportions for various end uses. The essential idea in formulating the concentrate is that the liquid surfactants and stabilizers and/or binders are dispersed on a carrier, such as the mineral of acicular crystals Wollastonite, or on perlite, the exfoliated mineral. This essentially dry product may then be shipped, stored, and blended with the cementitious components in the recommended ratio as required. A typical foaming concentrate is, in parts by weight, Wollastonite, 20, Renex 30, 2, Ultrawet 30DS, 2, guar gum, 2, and Swift protein colloid No. 2226, 4. Renex 30 is the Atlas nonionic surfactant polyoxyethylene (12) tridecyl ether. Ultrawet DS is the Arco Chemical Co. anionic surfactant sodium decyl benzene sulfonate. Colloid No. 2226 is a Swift Chemical Co. collagen protein urea salt.

The final density of the foam cementitious product may be regulated depending upon the type of cement employed, whether lightweight aggregates are present, and the amount of air that is incorporated into the foam. For example, when employing portland cement which when admixed with sand would have a density of about 140 – 180 pounds per cubic foot, or a minimum of about 60 pounds per cubic foot with the use of lightweight aggregate, it is possible to reduce the density to the order of 24 – 45 pounds per cubic foot (dry basis) by the practice of the present invention while still having satisfactory properties. Similarly gypsum cement when containing conventional amounts of lightweight aggregate such as perlite has a density of about 35 – 50 pounds per cubic foot. Upon adding air in accordance with the present invention, the density may be reduced considerably, for example, to about 10 – 30 pounds per cubic foot which is a presently preferred range for a product made from gypsum cement.

The amount of air added is substantially in excess of that conventionally employed in so-called air entrained cement. Depending upon the intended use and the initial density, the amount of air added by aeration may vary considerably, e.g., an amount sufficient to increase the volume of the cement by 5 – 400%, usually preferably 20 – 200%. For roof decks, the increase is preferably 20 – 100 volume percent, whereas for wall or attic insulation, a volume increase of 250 – 350% is preferred.

The invention will be further illustrated by the following examples, where unless otherwise specified all parts are on a weight basis.

Table I.

| Example No. | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| hydrated corn starch | | | | | | | | | | | | | 4.5 |
| pregelatinized starch | | | | | | | | | | | | | |

Table I.-continued

Examples of wet formulation.

| | | | | | | | | | | | | |
|---|---|---|---|---|---|---|---|---|---|---|---|---|
| guar gum | | | | | 9 | 9 | 9 | 9 | 9 | 9 | 9 | 9 | 9 |
| vermiculite | 35 | 40 | 47 | 2675 | 2805 | 30 | 30 | 36 | 36 | 45 | 40 | 111 | 68 |
| water | | | | | | | | | | | | 3 | |
| 1% borax solution | | | | | | | (a) | (a) | (b) | (b) | (a) | — | (a) |
| surfactant[1] | | | | | | | 0.6 | 0.6 | 0.6 | 0.6 | 0.6 | — | 0.15 |
| amount | | | | | | 30 | | | 30 | 30 | | 30 | 30 |
| gypsum cement | | 100 | | | | | | | | | | | |
| Portland cement | 100 | | | | 30 | | 30 | 30 | | | | | |
| magnesia cement: | | | | | | | | | | | | | |
| MgCl$_2$ . 6H$_2$O | | | 62.7 | 66.7 | | | | | | | 20 | | |
| MgSO$_4$ . 7H$_2$O | | | 37.3 | 33.3 | | | | | | | 10 | | |
| MgO | | | | | | | | | | | | | |
| Al$_2$(SO$_4$)$_3$ | | | | | | | | | | | | | |
| results: | | | | | | | | | | | | | |
| density (pcf) | 107 | 89 | 79.5 | 73.5 | 41.5 | 43.5 | 23.4 | 28.7 | 22.5 | 28.7 | 22.4 | 19.5 | 18.0 |
| penetration test (psi) | | | | | | | | | | | | 200 | 350 |

| Example No. | 14 | 15 | 16 | 17 | 18 | 19 | 20 | 21 | 22 | 23 | 24 | 25 | 26 |
|---|---|---|---|---|---|---|---|---|---|---|---|---|---|
| hydrated corn starch | | | | | | | | | 4.2 | 4.9 | | | |
| pregelatinized starch | | | 2 | 3.8 | 3.8 | 4 | 4 | 4 | | | 4 | 4 | 4 |
| guar gum | 1.5 | 1.5 | 0.6 | | | 1 | 1 | 1 | | | 1 | 1 | 1 |
| vermiculite | 9 | 9 | 9 | 9 | 9 | 9 | 9 | 9 | | | 9 | 9 | 0 |
| water | 100 | 100 | 100 | 100 | 100 | 100 | 100 | 100 | 56.8 | 65 | 98 | 85 | 80 |
| 1% borax solution | | | | | | 1 | 1 | 1 | | | | | |
| surfactant[1] | — | (a) | (a) | — | (c) | — | (b) | (a) | (c) | (c) | (a) | (a) | (a) |
| amount | — | 0.15 | 0.15 | — | 0.6 | — | 0.3 | 0.6 | 0.6 | 0.6 | 0.75 | 0.6 | 0.6 |
| gypsum cement | 30 | 30 | 30 | 30 | 30 | 30 | 30 | 30 | 30 | 30 | | 15 | 15 |
| Portland cement | | | | | | | | | | | 30 | | |
| magnesia cement: | | | | | | | | | | | | | |
| MgCl$_2$ . 6H$_2$O | | | | | | | | | | | | 9.4 | 10 |
| MgSO$_4$ . 7H$_2$O | | | | | | | | | | | | 5.6 | 5 |
| MgO | | | | | | | | | | | | 1.5 | |
| Al$_2$(SO$_4$)$_3$ | | | | | | | | | | | | | |
| results: | | | | | | | | | | | | | |
| density (pcf) | 26.8 | 13.7 | 11.7 | 21.5 | 15.2 | 20.5 | 13.0 | 10.0 | 25.7 | 20.5 | 22.8 | 13.7 | 15.6 |
| penetration test (pcf) | 120 | 60 | 110 | 190 | 140 | 330 | 140 | 90 | 500 | 330 | 140 | 90 | 300 |

[1]surfactant:
(a) Tergitol 15S9;
(b) Tergitol NPX;
(c) Tergitol TMN

Penetration Test Details

It is impractical to carry out a standard compressive test of the foamed products in regular testing press, because of their relatively low values. A penetration test was used instead. This is believed to be comparable to compressive strengths, but applying the compressive forces to much smaller areas. Instead of carrying the test to complete failure as in a compressive test, the penetration test end point was taken as the lowest load required to break the surface of the test piece.

The penetration test was carried out as follows: A series of drill bits of exactly known diameters were mounted on wooden blocks, so that the plane blunt ends of the bits extended about one-half inch from the surface of the blocks. A block with a projecting drill bit was placed on the test piece, and increasing weights were placed on top of the block until the bit penetrated about 1/32 – 1/16 inch below the surface. The penetration in psi. is obtained by dividing the last weight by the area of the bit end. This was repeated two or three times over different parts of the test piece to obtain an average value.

Examples 27–54

Table 2.

Dry blending formulation. Amount in parts by weight.

| Example No. | 27 | 28 | 29 | 30 | 31 | 32 | 33 | 34 | 35 | 36 | 37 | 38 | 39 | 40 |
|---|---|---|---|---|---|---|---|---|---|---|---|---|---|---|
| pregd. starch | 2 | 2 | 2 | 2 | 1.2 | 1.2 | 1.2 | 1.2 | 1.5 | 1.5 | 1.5 | 1.5 | 4 | 4 |
| guar gum | 0.5 | 0.5 | 0.5 | 0.5 | 0.3 | 0.3 | 0.3 | 0.3 | 0.38 | 0.38 | 0.38 | 0.38 | 1 | 1 |
| xanthan gum | | | | | | | | | | | | | | |
| surfactant[1] | (a) | (a) | (a) | (a) | (a) | (a) | (a) | (a) | — | (a) | (a) | (a) | (c) | (c) |
| amount | 0.03 | 0.2 | 0.4 | 0.2 | 0.1 | 0.4 | 0.2 | 0.4 | — | 0.2 | 0.2 | 0.4 | 0.15 | 0.3 |
| magnesia cement: | | | | | | | | | | | | | | |
| MgCl$_2$ . 6H$_2$O | | | | | | | | | | | | | | |
| MgO | | | | | | | | | | | | | | |
| Al$_2$(SO$_4$)$_3$ | | | | | | | | | | | | | | |
| vermiculite | 9 | 9 | 9 | | 9 | 9 | | | 9 | 9 | 9 | 9 | 9 | 9 |
| perlite | | | | 9 | | | 9 | 9 | | | | | | |
| gypsum cement | 30 | 30 | 30 | 30 | | | | | | 30 | 30 | 30 | 30 | 30 |
| Portland cement | | | | | 30 | 30 | 30 | 30 | 30 | | | | | |
| water | 100 | 100 | 100 | 100 | 58 | 58 | 58 | 58 | 73 | 73 | 73 | 73 | 100 | 100 |
| results: | | | | | | | | | | | | | | |
| density (pcf) | 19.1 | 16.5 | 15.0 | 16.0 | 27.7 | 22.6 | 28.8 | 18.1 | 27.4 | 19.6 | 15.5 | 13.6 | 15.6 | 14.0 |
| penetration (psi) | 250 | 140 | 60 | 100 | 300 | 60 | 60 | 30 | 700 | 100 | 140 | 100 | 90 | 60 |

| Example No. | 41 | 42 | 43 | 44 | 45 | 46 | 47 | 48 | 49 | 50 | 51 | 52 | 53 | 54 |
|---|---|---|---|---|---|---|---|---|---|---|---|---|---|---|
| pregd. starch | 4 | 4 | 4 | 4 | 100 | 2.2 | 3.3 | 4.5 | 5.6 | 4 | 4 | 4 | 4 | 4 |
| guar gum | 1 | 1 | 1 | 1 | 25 | 0.6 | 0.9 | 1.1 | 1.4 | 1 | | | 1 | 1 |
| xanthan gum | | | | | | | | | | | 1 | 1 | | |
| surfactant[1] | (c) | (b) | (d) | (c) | (c) | (c) | (e) | (e) | (c) | (c) | (c) | (c) | (c) | (a) |

Table 2.-continued

| | Dry blending formulation. Amount in parts by weight. | | | | | | | | | | | | | |
|---|---|---|---|---|---|---|---|---|---|---|---|---|---|---|
| amount | 0.6 | 0.6 | 0.75 | 0.75 | 18.8 | 0.6 | 0.6 | 0.6 | 0.6 | 1.0 | 1.5 | 0.75 | 0.75 | 0.6 |
| magnesia cement | | | | | | | | | | | | | | |
| MgCl₂ . 8H₂O | | | | | | | | | | | | | | 18.8 |
| MgO | | | | | | | | | | | | | | 11.2 |
| 30% Al₂(SO₄)₃ soln. | | | | | | | | | | | | | 3 | |
| vermiculite | 9 | 9 | 9 | 9 | 225 | | | | | | | 9 | 9 | 9 |
| perlite | | | | | | | | | | | | | | |
| gypsum cement | 30 | 30 | 30 | 30 | 750 | 30 | 30 | 30 | 30 | 30 | 30 | 30 | | |
| Portland cement | | | | | | | | | | | | | 30 | |
| water | 100 | 100 | 100 | 100 | 2500 | 37 | 56 | 74 | 95 | 100 | 120 | 120 | 105 | 85 |
| results: | | | | | | | | | | | | | | |
| density (pcf) | 11.5 | 12.2 | 11.6 | 11.9 | 7.3 | 32.2 | 25.8 | 21.9 | 20.2 | 14.0 | 15.4 | 16.1 | 19.0 | 19.6 |
| penetration (psi) | 40 | 60 | 40 | 60 | 30 | 700 | 400 | 370 | 330 | 140 | 190 | 500 | 150 | 330 |

(1)surfactant:
(a) Tergitol 15S9;
(b) Tergitol NPX;
(c) Tergitol TMN;
(d) Igepal CO 630;
(e) Alipal CO 433.

Examples 55–61

Table 3.

| Example No. | 55 | 56 | 57 | 58 | 59 | 60 | 61 |
|---|---|---|---|---|---|---|---|
| Wollastonite (F-1) (g.) | 2 | 2 | 2 | 2 | 2 | 2 | 2 |
| bentonite (g.) | 1 | 1 | 1 | — | — | — | — |
| Colloid No. 2226 (g.) | 0.4 | 0.4 | 0.4 | 0.4 | 0.4 | 0.4 | 0.4 |
| Renex 30 (g.) | 0.2 | 0.2 | 0.2 | 0.2 | 0.2 | 0.2 | 0.2 |
| Ultrawet 30 DS (g.) | 0.2 | 0.8 | 0.8 | 0.2 | 0.2 | 0.2 | 0.2 |
| guar gum (g.) | — | — | — | 0.2 | 0.2 | 0.2 | 0.2 |
| quickset plaster (g.) | 50 | 50 | 50 | 50 | 50 | 50 | 50 |
| perlite (g.) | 15 | 15 | 15 | 15 | 15 | 15 | 15 |
| water (g.) | 60 | 60 | 60 | 60 | 60 | 60 | 70 |
| density (pcf.) | 20.7 | 20.6 | 16.0 | 19.6 | 14.0 | 11.7 | 8.6 |
| penetration (psi.) | 190 | 180 | 60 | 100 | 50 | 25 | 10 |

Wollastonite is an acicular calcium silicate mineral.

In this series of tests, bentonite was compared with guar gum as a foam stabilizer. It had previously been found that an anionic surfactant was required to cause foaming in the presence of clay minerals, such as bentonite. In this series the order of adding the components to the water and mixing and/or aerating was varied. In examples Nos. 1, 8, and 9 the aqueous phase was prefoamed with the foaming concentrate. The gauging plaster and perlite were then mixed in. In the other examples all the components were dry blended, but the degree of mixing and aerating were varied. The more intense the aeration, the lower the density of the final air-dried product. The data show that the addition of guar gum further stabilized the foam structure so that lower densities can be obtained with adequate strengths. The strengths are directly related to the densities.

Examples 62–66

Table 4.

| Example No. | 62 | 63 | 64 | 65 |
|---|---|---|---|---|
| Wollastonite (F-1) (g.) | 2 | 2 | 2 | 2 |

Table 4.-continued

| Example No. | 62 | 63 | 64 | 65 |
|---|---|---|---|---|
| bentonite (g.) | 1 | 1 | 1 | 1 |
| colloid No. 2226 (g.) | 0.4 | 0.4 | 0.4 | 0.4 |
| Renex 30 (g.) | 0.2 | 0.2 | 0.2 | 0.2 |
| Ultrawet 30 DS (g.) | 0.4 | 0.4 | 0.4 | 0.4 |
| quickset plaster (g.) | 50 | 50 | 50 | 50 |
| perlite (g.) | 15 | 15 | 15 | 15 |
| water (g.) | 60 | 60 | 60 | 60 |
| density (pcf.) | 21.2 | 18.7 | 17.5 | 14.9 |
| penetration (psi.) | 180 | 60 | 85 | 60 |

These examples show that as the bentonite is mixed in water to a greater extent so as to increase the viscosity, the foam generation is decreased, resulting in higher densities and generally higher penetration strengths. For Example No. 62, the bentonite was predispersed in water by high shear mixing, while the rest of the foaming concentrate was dry blended with the gypsum plaster and perlite. For the other examples all the components, including bentonite powder, were dry blended, but the duration and degree of mixing with the water were varied.

Examples 66–72

Table 5.

| Example No. | 66 | 67 | 68 | 69 | 70 | 71 | 72 |
|---|---|---|---|---|---|---|---|
| F-1 (g.) | 6 | 7.6 | 6 | 10 | 6 | 6 | 6 |
| Colloid No. 2226 (g.) | 1.2 | 1.5 | 1.2 | 2 | 1.2 | 1.2 | 1.2 |
| Renex 30 (g.) | 0.6 | 0.75 | 0.6 | 1 | 0.6 | 0.6 | 0.6 |
| Ultrawet 30 DS (g.) | 0.6 | 0.75 | 0.6 | 1 | 1.2 | 1.2 | 1.2 |
| guar gum (g.) | 0.6 | 0.75 | 0.6 | 1 | — | — | — |
| bentonite (g.) | — | — | — | — | 3 | 3 | 3 |
| quickset plaster (g.) | 150 | 190 | 150 | 250 | 150 | 150 | 150 |
| perlite (g.) | 45 | 57 | 45 | 75 | 45 | 45 | 45 |
| water (g.) | 210 | 228 | 180 | 300 | 180 | 180 | 180 |
| density (pcf.) | 11.7 | 11.2 | 10.9 | 20.0 | 15.2 | 19.7 | 26.8 |

Table 5.-continued

| Example No. | 66 | 67 | 68 | 69 | 70 | 71 | 72 |
|---|---|---|---|---|---|---|---|
| penetration test (psi.) | 30 | 30 | 30 | 120 | 50 | 100 | 200 |

These examples contrast the use of guar gum with bentonite as foam stabilizers. The degree of aeration was varied to obtain a range of foamed densities. Guar gum is a more efficient foam stabilizer than bentonite.

Examples 73–76

Table 6.

| Example No. | 73 | 74 | 75 | 76 |
|---|---|---|---|---|
| Wollastonite (F-1) (g.) | 2 | 1 | 2 | 2 |
| Swift Colloid No. 2226 (g.) | 0.4 | 0.2 | 0.4 | 0.4 |
| Renex 30 (g.) | 0.2 | 0.1 | 0.2 | 0.2 |
| Ultrawet 30 DS (g.) | 0.2 | 0.1 | 0.2 | 0.2 |
| guar gum (g.) | 0.2 | 0.1 | 0.2 | 0.2 |
| fly ash (g.) | — | 10 | 10 | 10 |
| quickset plaster (g.) | 50 | 40 | 40 | 40 |
| perlite (g.) | 15 | 15 | 15 | 15 |
| water (g.) | 60 | 50 | 50 | 50 |
| density (pcf.) | 12 | 22 | 15.5 | 12.6 |
| penetration test (psi.) | 30 | 190 | 60 | 30 |

These examples show that fly ash may be substituted for part of the gypsum.

Examples 77–81

Table 7.

| Example No. | 77 | 78 | 79 | 80 | 81 |
|---|---|---|---|---|---|
| Wollastonite (g.) | 2 | 2 | 2 | 2 | 2 |
| Colloid No. 2226 (g.) | 0.4 | 0.4 | 0.4 | 0.4 | 0.4 |
| Renex 30 (g.) | 0.2 | 0.2 | 0.2 | 0.2 | 0.2 |
| Ultrawet 30 DS (g.) | 0.2 | 0.2 | 0.2 | 0.2 | 0.2 |
| guar gum (g.) | 0.2 | 0.2 | 0.2 | 0.2 | 0.2 |
| gypsum cement (g.) | 50 | 50 | 50 | 50 | 50 |
| perlite (g.) | 15 | 15 | 15 | 15 | 20 |
| water (g.) | 50 | 40 | 38 | 35 | 50 |
| Acryl 60 latex (g.) | — | — | 2.5 | 5 | — |
| density (pcf.) | 12.1 | 17.2 | 19.8 | 19.2 | 14.3 |
| penetration (psi.) | 30 | 60 | 120 | 120 | 60 |

Gypsum cement was used in place of the gauging plaster employed in the preceding examples. An acrylic latex can be used to increase the strength of the foamed gypsum product.

Example 82

This illustrates the fire proofing properties of compositions of this invention. A Flame Spread Test was carried out as follows: A formulated dry blend consisting of 6 pounds foaming concentrate, 100 pounds "Hardwall" gypsum plaster, and 30 pounds perlite, was dispersed in 75 pounds water and aerated vigorously to foam. The foaming concentrate comprised 11.6 parts Swift colloid No. 2226, 5.75 parts Renex surfactant, 5.75 parts Ultrawet, 5.75 parts guar gum, and 59 parts Wollastonite Fl. This foamed composition was sprayed unto 20 inches × 24 feet of ¼ inch Transite asbestos board to a thickness of ⅜ inch and gave an air-dry density of 20 pcf. It was submitted to the Hardwood Plywood Manufacturers Association at Arlington, Virginia for a standard flame spread test by the ASTM method E84-70. The test specimens were conditioned for 16 days at a controlled temperature of 70° to 75° F. and a controlled relative humidity of 35–40%. A flame spread length of 10 feet was observed under the test conditions. This compares to a flame length of 6½ feet for asbestos cement board and 100 feet for red oak flooring. It thus meets the acceptance flame spread criteria for Class A material of 25 and under.

Although presently preferred embodiments of the invention have been described with particularity, it would be appreciated that various changes and modifications may suggest themselves to those of ordinary skill in the art upon being apprised of the present invention. It is intended to encompass all such changes and modifications as fall within the scope and spirit of the appended claims.

We claim:

1. A low density cementitious foamed composition comprising 100 parts by weight of a mineral cement; about 10–50 parts by weight of a filler, selected from the group consisting of an exfoliated lightweight aggregate and hollow silicate spheres; about 1–20 parts by weight of an organic, water-soluble film former selected from the group consisting of guar gum, pregelatinized starch, xanthan gum, and protein colloids; about 0.1–3.0 parts by weight of surface active foaming agents; and at least about 8% by volume, based on the total volume of said components, of air, said cementitious composition having been processed with from about 30 to about 150 parts by weight of water.

2. A composition according to claim 1 wherein said mineral cement is selected from the group consisting of gypsum cement, portland cement, calcium aluminate cement, and magnesia cement.

3. A composition according to claim 1 wherein said surface active foaming agents are selected from the group consisting of synthetic anionic and nonionic surface active foaming agents and mixtures thereof.

4. A composition according to claim 1 wherein said mineral cement is gypsum cement, and wherein said composition has a dry density of about 10–30 pounds per cubic foot.

5. A composition according to claim 1 wherein said mineral cement is portland cement, and said composition has a dry density of about 25–45 pounds per cubic foot.

6. A method for producing a foamed cementitious composition comprising the steps of mixing together about 30–150 parts of water, about 100 parts by weight of a mineral cement, up to about 50 parts by weight of a lightweight mineral aggregate or hollow silicate spheres, about 1–20 parts by weight of an organic water-soluble film former selected from the group consisting of guar gum, pregelatinized starch, xanthan gum, and protein colloids, and 0.1–3.0 parts by weight of a mixture of anionic and nonionic surface active foaming agents, stirring the resulting mixture and incorporation air therein in an amount of at least 8 percent by volume based on the volume of the final foamed composition.

7. A method according to Claim 6 further comprising preparing a dry blend of said cement, said film former, said surface active agents, and said aggregate, thereafter introducing said dry blend gradually with stirring and aerating into water while incorporating said air thereto.

* * * * *